US012101867B2

(12) United States Patent
Latrasse

(10) Patent No.: US 12,101,867 B2
(45) Date of Patent: Sep. 24, 2024

(54) MICROWAVE REACTOR FOR CONTINUOUS TREATMENT BY MICROWAVES OF A FLOWING FLUID MEDIUM

(71) Applicant: SAIREM SOCIETE POUR L'APPLICATION INDUSTRIELLE DE LA RECHERCHE EN ELECTRONIQUE ET MICRO ONDES, Decines Charpieu (FR)

(72) Inventor: Louis Latrasse, Dommartin (FR)

(73) Assignee: SAIREM SOCIETE POUR L'APPLICATION INDUSTRIELLE DE LA RECHERCHE EN ELECTRONIQUE ET MICRO ONDES, Decines Charpieu (FR)

( * ) Notice: Subject to any disclaimer, the term of this patent is extended or adjusted under 35 U.S.C. 154(b) by 697 days.

(21) Appl. No.: 17/295,622

(22) PCT Filed: Nov. 21, 2019

(86) PCT No.: PCT/FR2019/052779

§ 371 (c)(1),
(2) Date: May 20, 2021

(87) PCT Pub. No.: WO2020/104757

PCT Pub. Date: May 28, 2020

(65) Prior Publication Data

US 2022/0022293 A1 Jan. 20, 2022

(30) Foreign Application Priority Data

Nov. 21, 2018 (FR) .................................... 18/71666

(51) Int. Cl.
*H05B 6/80* (2006.01)
*H05B 6/70* (2006.01)

(52) U.S. Cl.
CPC ............ *H05B 6/802* (2013.01); *H05B 6/701* (2013.01)

(58) Field of Classification Search
CPC ................................ H05B 6/701; H05B 6/802
(Continued)

(56) References Cited

U.S. PATENT DOCUMENTS

2006/0213759 A1* 9/2006 Holzschuh ........... B01J 19/2415 204/157.15
2010/0012650 A1* 1/2010 Drozd .................... H05B 6/701 219/690
(Continued)

FOREIGN PATENT DOCUMENTS

EP 1397939 A1 3/2004
EP 1291077 B1 * 9/2007 ............ B01J 19/126
(Continued)

OTHER PUBLICATIONS

International Search Report issued Feb. 21, 2020 re: Application No. PCT/FR2019/052779, pp. 1-2, citing: EP 1397939 A1, US 2006213759 A1, US 2015318148 A1 and US 2010012650 A1.

*Primary Examiner* — Eric S Stapleton
(74) *Attorney, Agent, or Firm* — CANTOR COLBURN LLP

(57) ABSTRACT

A microwave reactor having a flow tube, transparent to microwave, extending longitudinally along a flow axis for a fluid medium flow; an input waveguide extending along a propagation axis orthogonal to the flow axis, having a rectangular cross-section with two large sides parallel to the flow axis and two small sides orthogonal to the flow axis; and an enclosure inside which the flow tube extends, made of a material reflective to microwaves, having a lateral dimension greater than the small dimension of the small sides of the input waveguide. The input waveguide is transversely fixed on the enclosure which has an input
(Continued)

window surrounded by the input waveguide for propagation of microwaves through the input window to the inside of the enclosure.

20 Claims, 10 Drawing Sheets

(58) Field of Classification Search
USPC .......................................................... 219/678
See application file for complete search history.

(56) References Cited

U.S. PATENT DOCUMENTS

| | | | | |
|---|---|---|---|---|
| 2015/0318148 | A1 * | 11/2015 | Chen | H01J 37/32311<br>315/39 |
| 2022/0022293 | A1 * | 1/2022 | Latrasse | H05B 6/701 |

FOREIGN PATENT DOCUMENTS

| | | | | |
|---|---|---|---|---|
| EP | 1397939 B1 * | 12/2007 | | F24H 1/101 |
| WO | 02100131 A1 | 12/2002 | | |

* cited by examiner

[Fig.1]
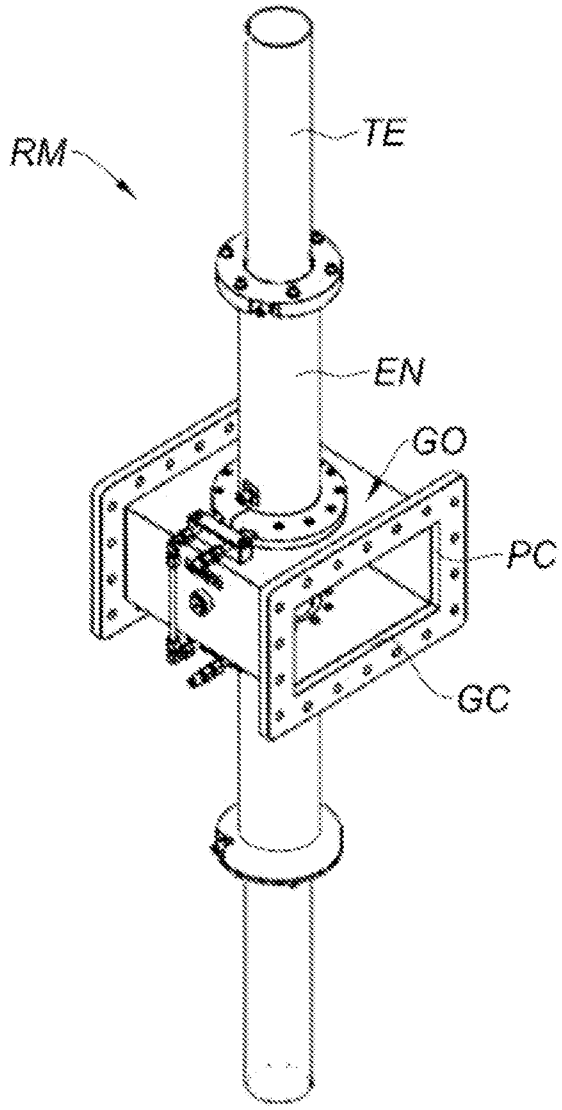
[Fig.2]
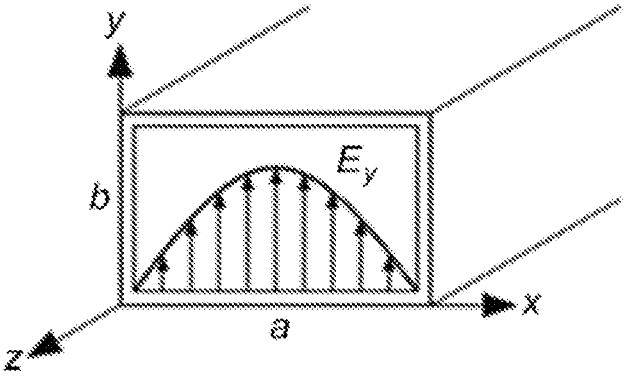

[Fig.3]
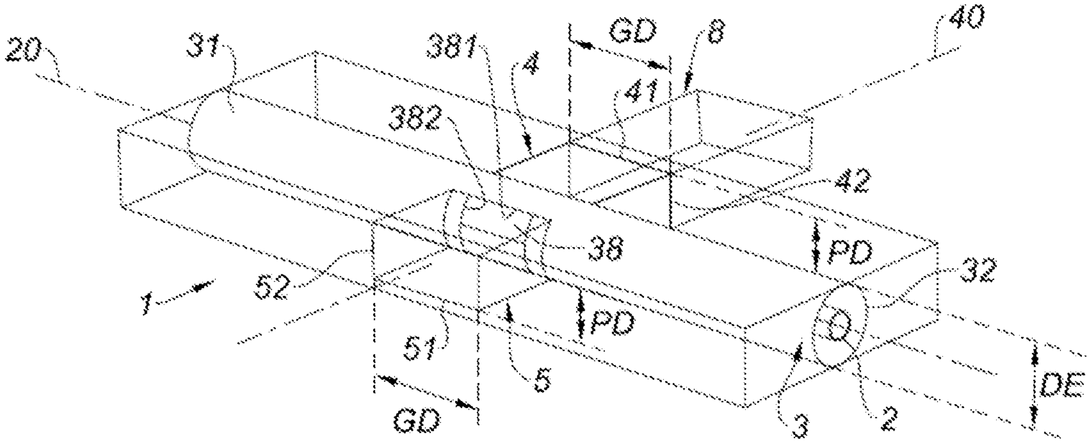
[Fig.4]
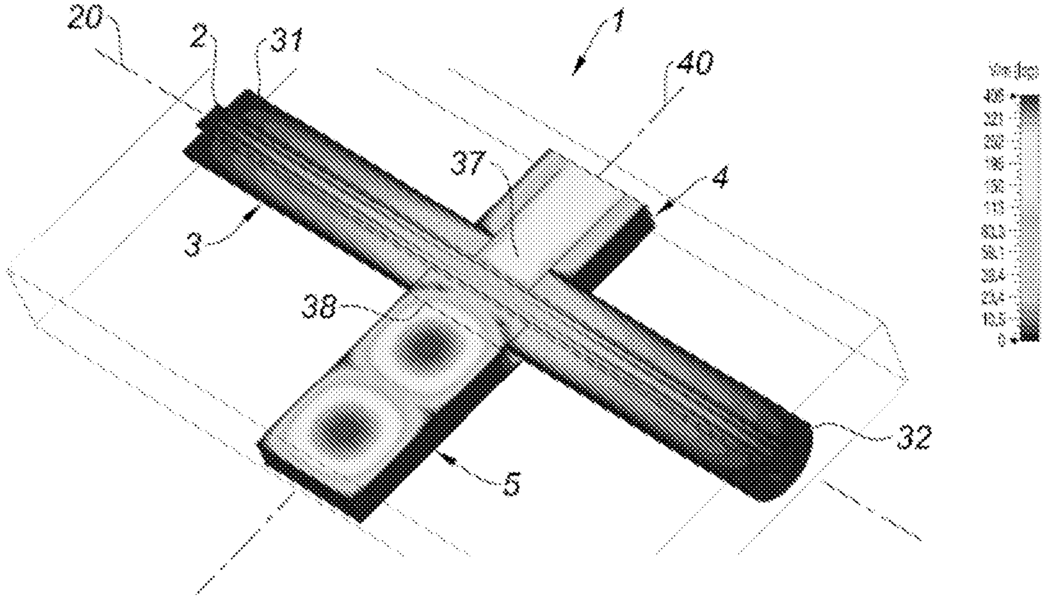

[Fig.5]
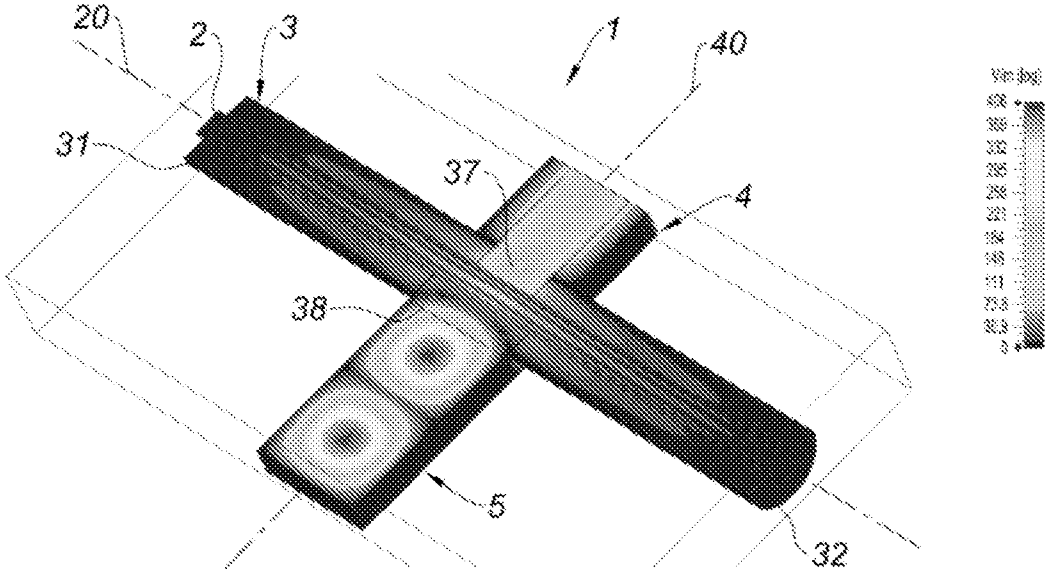
[Fig.6]
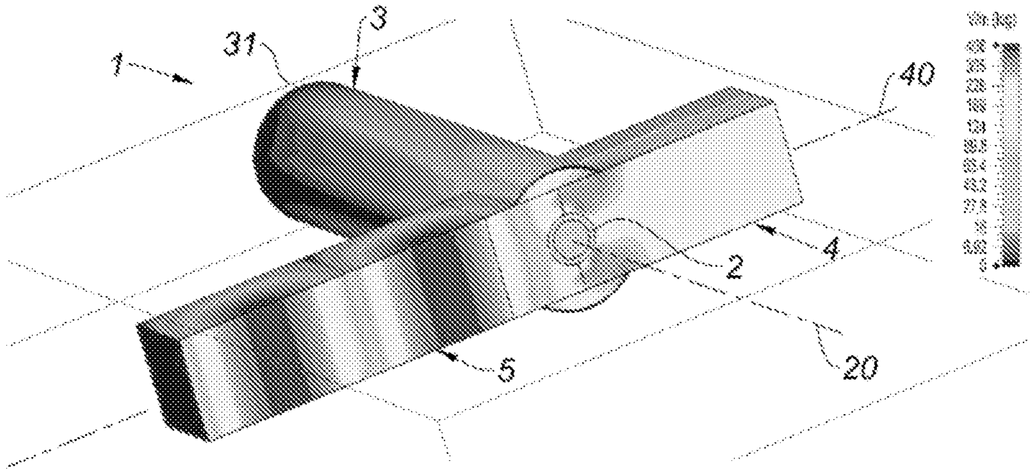

[Fig.7]
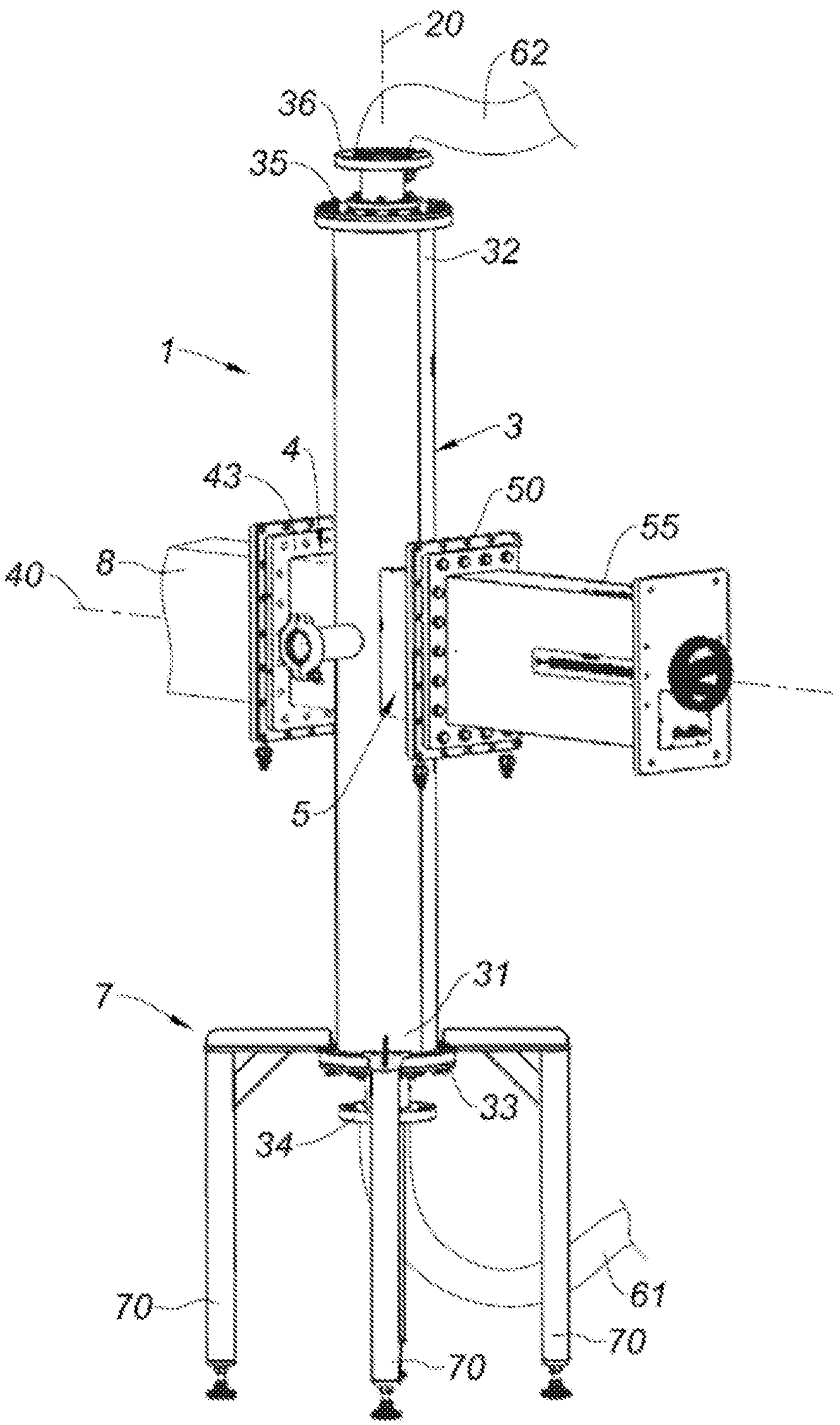

[Fig.8]
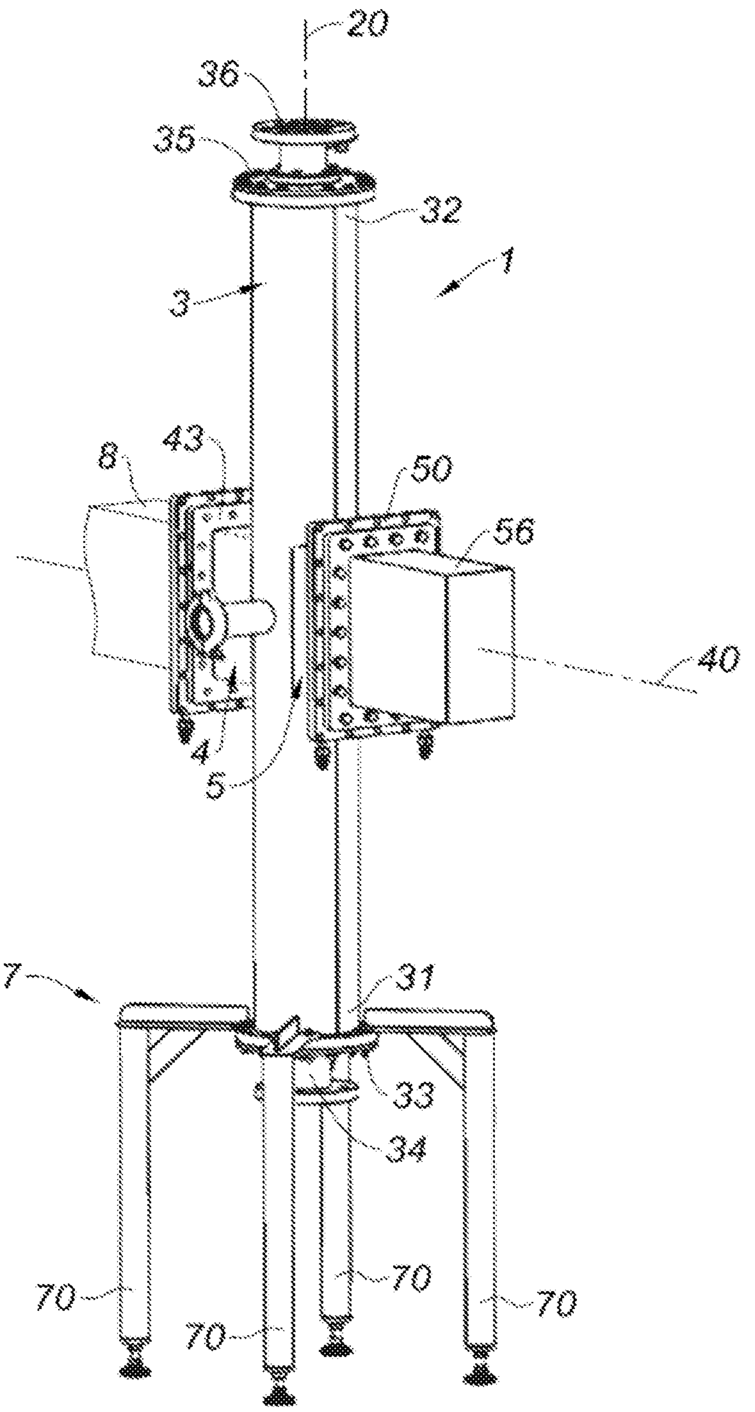

[Fig.9]
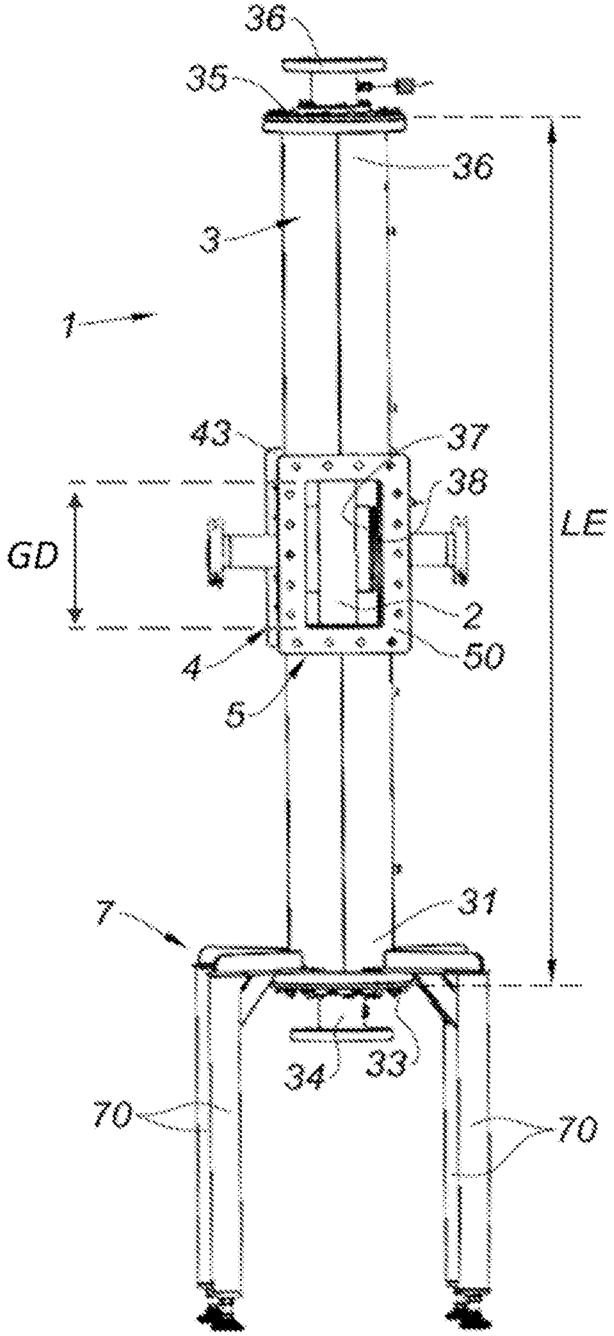

[Fig.10]
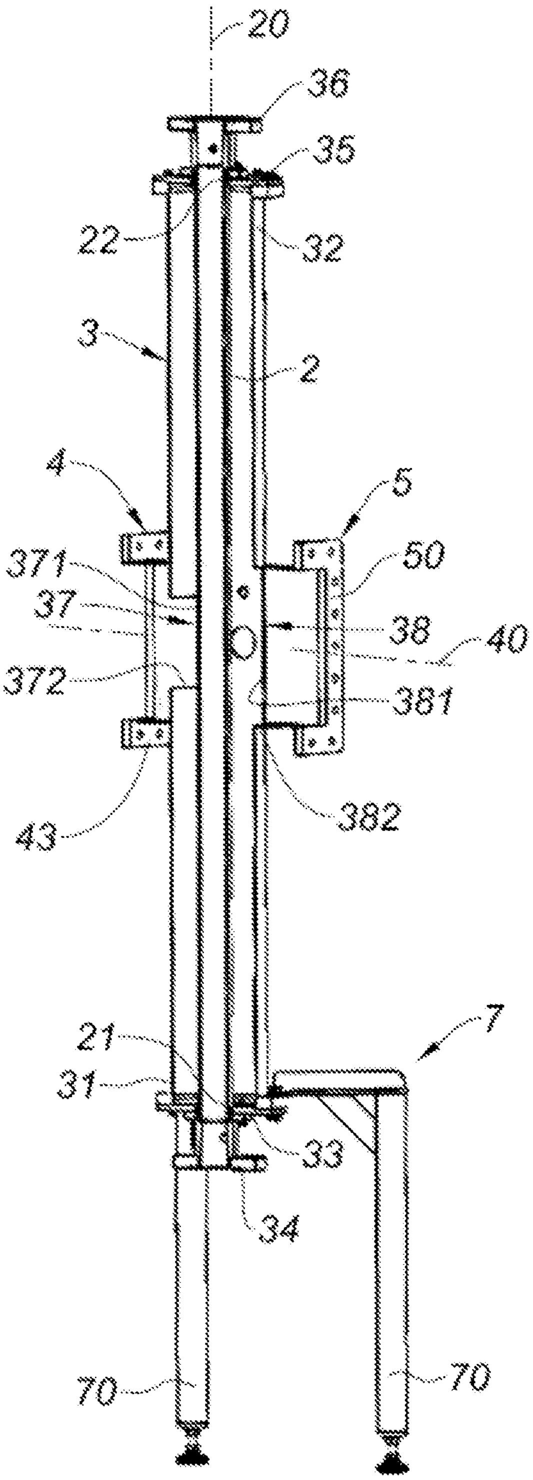

[Fig.11]
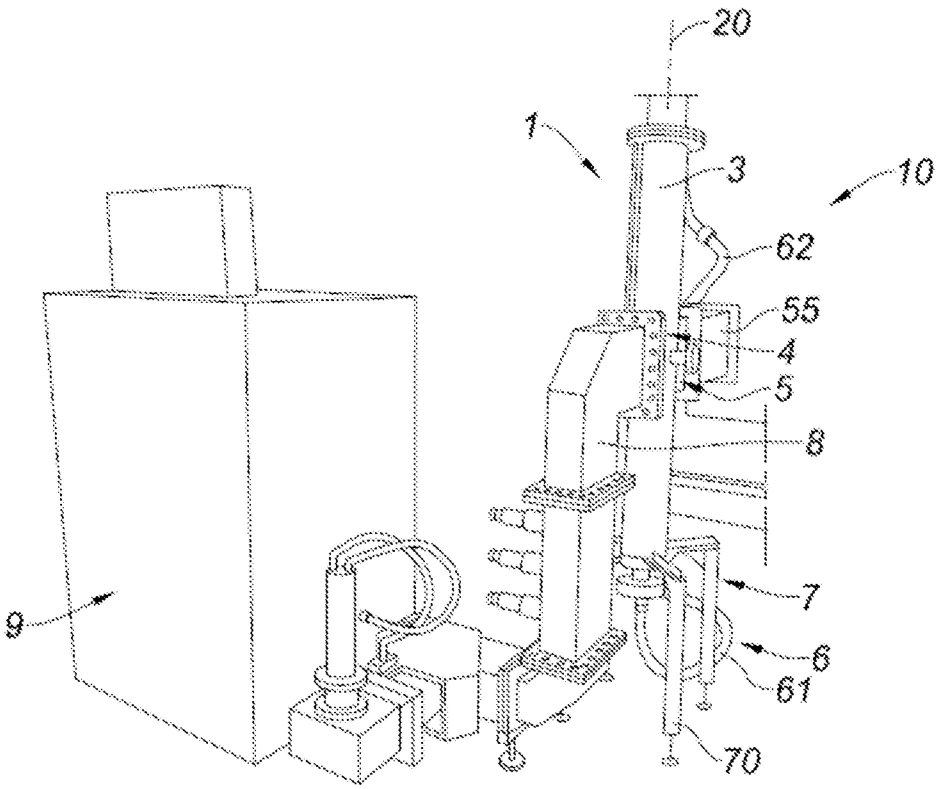

[Fig.12]
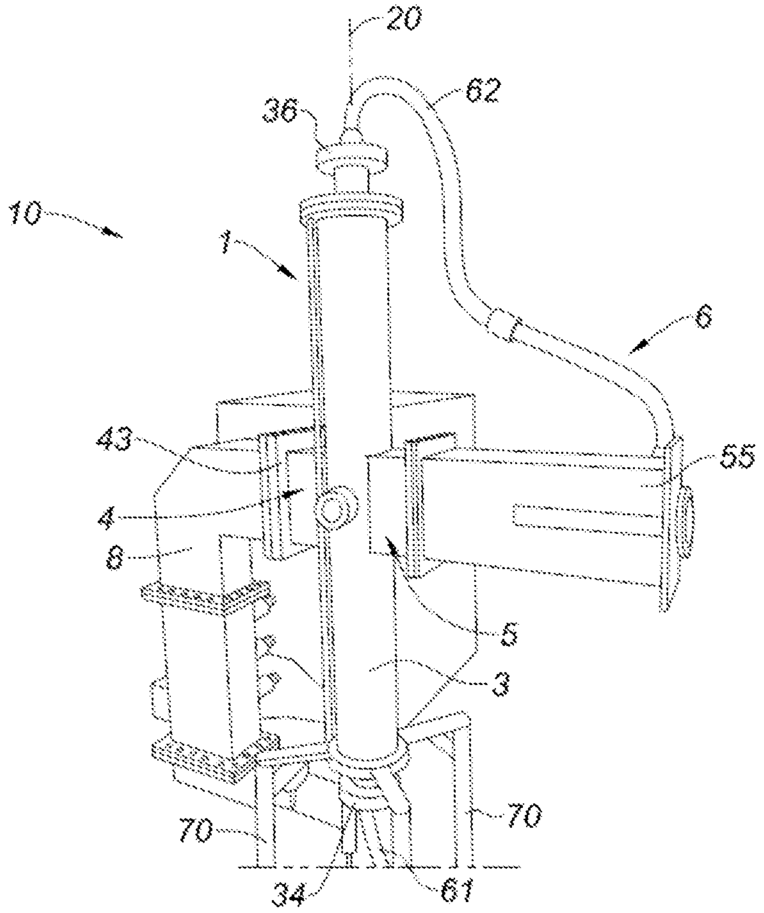

[Fig.13]
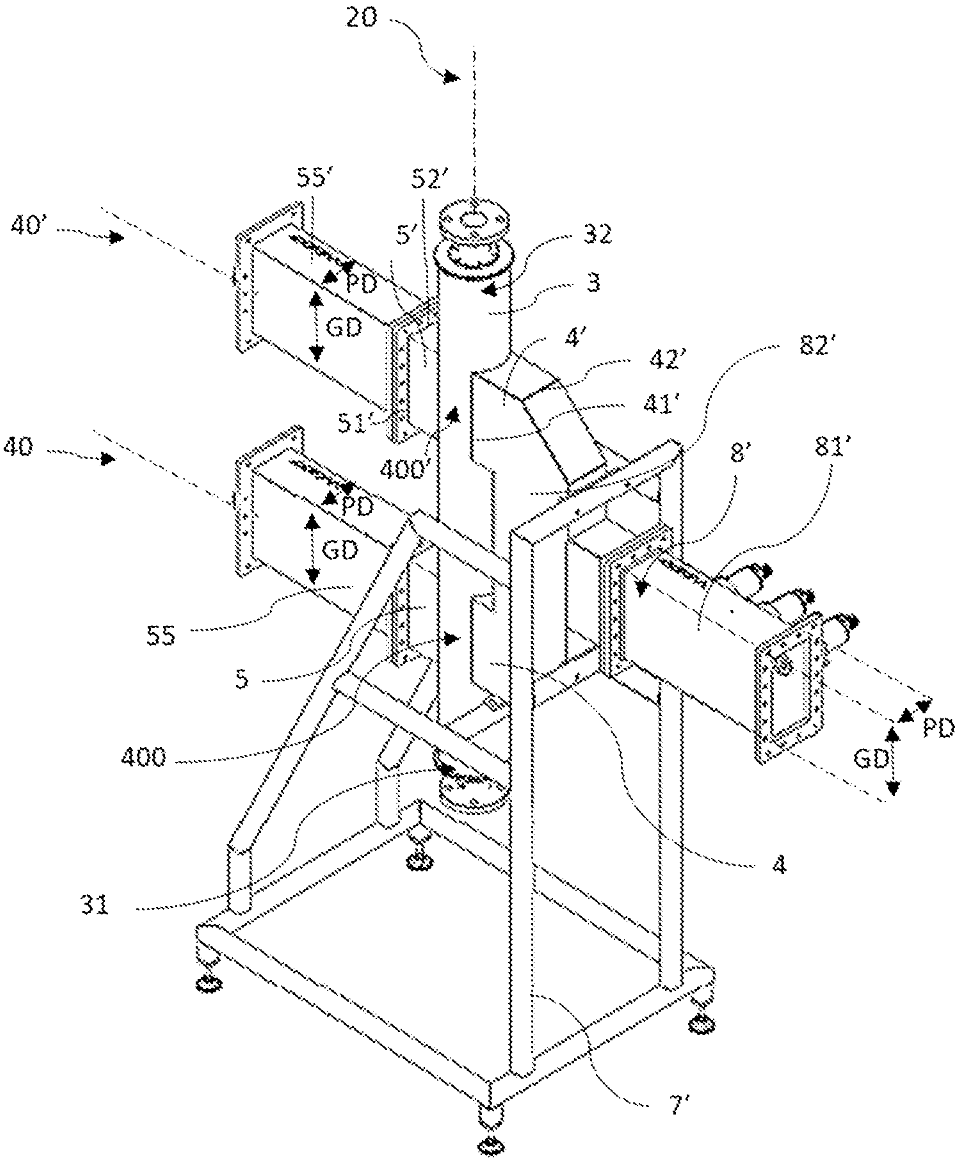

MICROWAVE REACTOR FOR CONTINUOUS TREATMENT BY MICROWAVES OF A FLOWING FLUID MEDIUM

TECHNICAL FIELD

The present disclosure relates to a microwave reactor for a continuous treatment by microwaves of a flowing fluid medium, as well as an associated microwave installation and a method for a continuous treatment by microwaves of a flowing fluid medium.

The disclosure pertains to the field of continuous treatment by microwaves of a flowing fluid medium, such as a liquid medium, a viscous medium, a pasty medium, a liquid/solid or liquid/gas biphasic mixture medium.

The disclosure finds application, desirably but without limitation, in the continuous heat treatment by microwaves of pumpable products, in particular agri-food products and in particular homogeneous liquid products or products with evenly distributed pieces in a sufficiently consistent phase.

BACKGROUND

Referring to FIG. 1, it is known from the state of the art to use a microwave reactor RM, in general called «downstream» reactor, comprising a flow tube TE made of a microwave-transparent material, a waveguide GO connected to a microwave generator and coupled to the flow tube TE for continuous treatment by microwaves of the fluid medium, and an enclosure EN inside which the flow tube TE extends at least partially, such an enclosure EN being made of a microwave-reflective material.

As shown in this FIG. 1, it is common to have, on the one hand, a flow tube TE extending longitudinally along a flow axis and, on the other hand, a waveguide GO having a rectangular cross-section with two large sides GC (that is to say sides having the largest dimension) and two small sides PC (that is to say sides having the smallest dimension), wherein the large sides GC of the waveguide GO are orthogonal to the flow axis, whereas the small sides PC of the waveguide GO are parallel to the flow axis.

Such a «downstream» reactor, also described, for example, by the document US 2006/0213759, turns out to be relatively effective for slightly absorbent fluid mediums, that is to say having a low dielectric loss coefficient (or a small loss angle, a small loss tangent, a small delta tangent or a low losses factor). Indeed, with a slightly absorbent fluid medium, the microwaves cross the fluid medium quite easily because the dielectric losses are low and, in addition, the absorbed field in the fluid medium is quite homogeneous.

Conversely, such a «downstream» reactor turns out to be relatively inefficient for absorbent fluid mediums, or very absorbent, that is to say having a high dielectric loss coefficient (or a large loss angle, a large loss tangent, a large delta tangent or a high losses factor), such as for example water-based medium, some solvents for extraction, agri-food products, such as compote, some chemical products, etc.

Indeed, as represented in FIG. 3, the electric field (Ey) in a waveguide with a rectangular cross-section is typically distributed parallel to the small sides (b) of the waveguide, and is maximum at the middles of the large sides (a) of the waveguide. Thus, in the case of a «downstream» reactor with an absorbent fluid medium, the electric field will, on the one hand, have difficulty to penetrate into the medium and, on the other hand, reflect the waves because the electric field will encounter a boundary and a very abrupt change in the dielectric losses at the level of the flow tube because:

- the electric field is parallel to the small sides PC of the waveguide GO and is therefore parallel to the flow tube TE in which the fluid medium flows, and
- the electric field is maximum at the middles of the large sides GC of the waveguide GO, namely at the location where the flow tube TE is placed.

Consequently, in a «downstream» reactor, it is as if the electric field will encounter a mirror and be largely, or at least in a non-negligible proportion, reflected towards the microwave generator, whereas the absorbed portion of the field will be reflected only one the microwave generator side because the waves cannot cross the absorbent fluid medium. Consequently, this shape of the «downstream» reactor locally creates a hot spot, and heating therefore becomes heterogeneous and inefficient.

SUMMARY

In particular, the present disclosure aims at providing a microwave reactor for a continuous treatment by microwaves of a flowing fluid medium, that is particularly suited to slightly absorbent fluid mediums and also to very absorbent fluid mediums.

An object of the disclosure is to enable a homogeneous and even heating, without any local hot spot in the fluid medium.

To this end, it provides a microwave reactor for a continuous treatment by microwaves of a flowing fluid medium, such a microwave reactor comprising:

- a flow tube, made of a microwave-transparent material, extending longitudinally along a flow axis for a flow of the fluid medium along said flow axis;
- an input waveguide extending along a propagation axis for a microwaves propagation along said propagation axis, said input waveguide having a rectangular cross-section with two large sides defining a large dimension and two small sides defining a small dimension shorter than the large dimension, and said input waveguide being coupled to the flow tube for continuous treatment by microwaves of the fluid medium, with the flow axis orthogonal to the propagation axis; and
- an enclosure inside which the flow tube extends at least partially, said enclosure being made of a microwave-reflective material and extending longitudinally along the flow axis;

the microwave reactor according to the disclosure being remarkable in that:

- the large sides of the input waveguide are parallel to the flow axis, whereas the small sides of the input waveguide are orthogonal to the flow axis;
- the enclosure has a lateral dimension measured parallel to the small sides of the input waveguide, said lateral dimension being longer than the small dimension of the input waveguide, said input waveguide being transversely fixed on the enclosure, said enclosure having an input window surrounded by the input waveguide for a microwaves propagation through the input window inside the enclosure, and
- the enclosure extends longitudinally along the flow axis over a determined enclosure length between a first end and a second end opposite to one another, said enclosure length being strictly longer than the large dimension of the input waveguide.

Thus, with such a reactor according to the disclosure, the electric field is parallel to the small sides of the input waveguide and is therefore orthogonal (or perpendicular) to the flow tube in which the fluid medium flows, and thus the electric field will not encounter any boundary or abrupt transition towards high dielectric losses as it could circumvent the flow tube, even in the case of fluid mediums that are absorbent or with high dielectric losses.

Moreover, this coupling between the input waveguide and the flow tube will promote the penetration of the waves all around the tube, thereby creating a more even heating on the section of the flow tube.

In order to promote a progressive penetration of the waves along the flow tube, the latter is surrounded by an enclosure forming a cavity extending on each side of the input waveguide, and thus the wave will remain progressive and be absorbed almost totally before reaching the ends of the flow tube.

According to one possibility, the enclosure length is 1.5 times to 6 times longer than the large dimension of the input waveguide.

This feature allows ensuring a progressive absorption of the microwaves by an absorbent fluid medium, and avoiding the apparition of a resonance phenomenon inside the enclosure: when this enclosure has an enclosure length shorter than or equal to the large dimension of the input waveguide, the absorption of the microwaves is not progressive along the flow axis, thereby promoting the formation of hot spots inside the fluid medium, leading to a heterogeneous heating of the latter.

In an advantageous embodiment, the enclosure has a circular section with a diameter corresponding to the lateral dimension.

According to one possibility, the input window is delimited by two longitudinal edges parallel to the large sides of the input waveguide and by two lateral edges parallel to the small sides of the input waveguide, wherein these longitudinal edges have a length shorter than or equal to the large dimension and the lateral edges have a length shorter than or equal to the small dimension.

Thus, the input window has a rectangular cross-section equivalent to or smaller than the rectangular cross-section of the input waveguide.

Advantageously, the longitudinal edges of the input window have a length shorter than the large dimension and the lateral edges of the input window have a length equal to the small dimension, so that the input window forms an input iris.

Thus, the input waveguide is attached to the enclosure by an input window featuring longitudinal edges shorter than the large sides of the input waveguide, thereby forming an input iris. Such an input iris is an important parameter that the user can tune by modeling to adapt to the flowing fluid medium in order to optimize the treatment.

In particular, the iris-like shape of the input window causes a modification of the modulus of the microwaves passing through such an input iris, thereby allowing improving the penetration of these microwaves into the fluid medium circulating in the flow tube.

Thus, thanks to the present of an input iris, it is possible to optimize the sizing of a microwave reactor according to the disclosure by adapting, for example, the size of this input iris to a particular product brought to circulate in the flow tube.

Conversely, if the longitudinal edges of the input window have a length equivalent to the large dimension, then the input window does not form an input iris.

According to one possibility, the enclosure includes no inner element disposed between the input window and the flow tube.

In other words, the portion of the enclosure lying between the input window and the flow tube is unoccupied and in particular does not have any element prone to modify or hinder the propagation of the microwaves from the input window up to the flow tube.

In particular, the enclosure does not include any device for making a coolant flow around said flow tube, allowing monitoring the temperature of the fluid medium flowing in the latter.

Indeed, it is known from the state of the art to convey such a coolant in a helical tube encircling the flow tube: this helical tube is then positioned parallel to the small sides of the input waveguide (and therefore parallel to the electric field of the microwaves circulating therein) and prevents the propagation of the microwaves in the flow tube.

Thus, by interposing no element in the cavity defined by the enclosure between the input window and the flow tube, it is possible to ensure a better penetration of the microwaves into the fluid medium inside the flow tube.

In a particular embodiment, the microwave reactor comprises an output waveguide transversely fixed on the enclosure diametrically opposite to the input waveguide, wherein:

- said output waveguide extends along the propagation axis and has a rectangular cross-section with two large sides defining a large dimension, and two small sides defining a small dimension shorter than the large dimension, the large sides of the output waveguide being parallel to the flow axis, whereas the small sides of the output waveguide are orthogonal to the flow axis, the large dimension of the output waveguide being equivalent to the large dimension of the input waveguide and the small dimension of the output waveguide being equivalent to the small dimension of the input waveguide;
- said enclosure has an output window diametrically opposite to the input window and surrounded by the output waveguide for a microwaves propagation through the output waveguide.

According to one possibility, the output window is delimited by two longitudinal edges parallel to the large sides of the output waveguide and by two lateral edges parallel to the small sides of the output waveguide, wherein the longitudinal edges have a length shorter than or equal to the large dimension and the lateral edges have a length shorter than or equal to the small dimension.

Thus, the output window has a rectangular cross-section equivalent to or smaller than the rectangular cross-section of the output waveguide.

In a particular embodiment, the longitudinal edges of the output window have a length shorter than the large dimension and the lateral edges of the output window have a length equal to the small dimension, so that the output window forms an output iris.

Thus, the output waveguide is attached to the enclosure by an output window featuring longitudinal edges shorter than the large sides of the output waveguide, thereby forming an output iris.

Conversely, if the longitudinal edges of the output window have a length equivalent to the large dimension, then the output window does not form an output iris.

Thus, it may be provided to have only one input iris (as described hereinabove), or to have only one output iris, or to have an input iris and an output iris.

Advantageously, the microwave reactor further comprises a short-circuit device attached on the output waveguide, said short-circuit device being either of the type having a short-circuit piston adjustable along the propagation axis, or of the static short-circuit type.

Alternatively, the enclosure is closed opposite the input waveguide and thus provides a curved reflective surface located diametrically opposite to the input waveguide.

According to one feature, the input waveguide is transversely fixed on the enclosure:

- either at a distance from the first end comprised between 0.4 and 0.6 times the enclosure length (and therefore substantially at the middle of the enclosure);
- or at a distance from the first end comprised between 0.1 and 0.4 times the enclosure length (and therefore substantially closer to one end of the enclosure).

According to another feature, the flow axis is a vertical axis so that the flow tube and the enclosure extend vertically, and the propagation axis is a horizontal axis so that the input waveguide extends horizontally.

Advantageously, the enclosure rests at height on a support base, such as a support base provided with several support legs, so that the enclosure is raised off the ground thanks to the support base.

In a particular embodiment, the enclosure includes lids provided on the first end and the second end, said lids being provided with connection fittings to connect a first end and a second end of the flow tube respectively to a first pipe and to a second pipe of a flow-establishing system for making the fluid medium flow.

It should be noted that the enclosure may have a constant diameter over the entire length thereof or, alternatively, the enclosure may have a diameter that gets reduced at its ends so that the enclosure could be conical, or truncated at the ends.

In one embodiment, the microwave reactor includes another input waveguide extending parallel to the propagation axis, said other input waveguide having a rectangular cross-section with two large sides defining a large dimension and two small sides defining a small dimension shorter than the large dimension, and said other input waveguide being coupled to the flow tube for continuous treatment by microwaves of the fluid medium:

- wherein the large sides of said other input waveguide are parallel to the flow axis, whereas the small sides of said other input waveguide are orthogonal to the flow axis;
- wherein the lateral dimension of the enclosure is larger than the small dimension of said other input waveguide, said other input waveguide being transversely fixed on the enclosure, said enclosure having another input window surrounded by said other input waveguide for a microwaves propagation through said other input window inside the enclosure, and
- wherein the enclosure length is strictly longer than the large dimension of said other input waveguide.

In other words, the microwave reactor includes, besides the input waveguide, another input waveguide parallel to the latter and having similar structural and geometrical characteristics.

Thus, this other input waveguide allows introducing microwaves into the enclosure via another input window offset with respect to an input window along the flow axis.

This microwaves introduction offset with respect to the propagation axis of the input waveguide allows for a better treatment of the flowing fluid medium in the flow tube (in particular a more homogeneous treatment along the flow axis), in particular when this fluid medium is highly absorbent.

Advantageously, the other input waveguide is identical to the input waveguide, and has in particular a large dimension and a small dimension identical to those of said input waveguide.

It is also advantageous that the other input waveguide is made of the same material as the input waveguide, so that the kinematics of the microwaves propagation in this other input waveguide are identical to those in the input waveguide.

According to one possibility, the input waveguide and the other input waveguide are linked to the same upstream waveguide intended for the introduction of microwaves inside each of said input waveguides and other input waveguide, said upstream waveguide having at least one rectilinear portion having a rectangular cross-section with two large sides defining a large dimension and two small sides defining a small dimension shorter than the large dimension, the large sides of said upstream waveguide being parallel to the flow axis, whereas the small sides of said upstream waveguide are orthogonal to the flow axis.

Thus, by connecting the upstream waveguide to a microwave generator, it is possible to achieve the microwaves propagation simultaneously in the input waveguide and in the other input waveguide, parallel to the propagation axis.

Hence, the function of the upstream waveguide is to transmit the microwaves propagating therewithin to each of the input waveguide and the other input waveguide.

It is also advantageous that the large dimension of the upstream waveguide is equivalent to the large dimension of the input waveguide and of the other input waveguide, and that the small dimension of the upstream waveguide is equivalent to the small dimension of the input waveguide and of the other input waveguide.

In this manner, the propagation of the microwaves in the upstream waveguide is identical to that in the input waveguide and in the other input waveguide.

According to one feature, the microwave reactor comprises another output waveguide transversely fixed on the enclosure diametrically opposite to the other input waveguide, where:

- said other output waveguide extends parallel to the propagation axis and has a rectangular cross-section with two large sides defining a large dimension and two small sides defining a small dimension shorter than the large dimension, the large sides of the other output waveguide being parallel to the flow axis, whereas the small sides of the other output waveguide are orthogonal to the flow axis, the large dimension of the other output waveguide being equivalent to the large dimension of the other input waveguide and the small dimension of the other output waveguide being equivalent to the small dimension of the other input waveguide;
- said enclosure has another output window diametrically opposite to the other input window and surrounded by the other output waveguide for a microwave propagation through the other output window.

In other words, the microwave reactor includes another output waveguide associated to the other input waveguide, this other output waveguide having similar structural and geometrical characteristics and the same function as the output waveguide associated to the input waveguide.

In particular, this other output waveguide may have the same large dimension and the same small dimension as the output waveguide and the input waveguide.

In the same manner as with the output waveguide, this other output waveguide may also be provided with a short-circuit device, for example of the short-circuit piston type adjustable parallel to the propagation axis or of the static short-circuit type.

The present disclosure also concerns a microwave installation for a continuous treatment by microwaves of a flowing fluid medium, such a microwave installation comprising:

- a microwave reactor according to the disclosure;
- a microwave generator connected to the input waveguide;
- a flow-establishing system connected to the flow tube upstreams and downstreams to ensure a flow of the fluid medium inside the flow tube.

When the microwave reactor includes another input waveguide, it is advantageous that the microwave generator of the microwave installation is also connected to this other input waveguide.

In the embodiment wherein the microwave reactor is as previously described and includes an upstream waveguide linked to the input waveguide and to the other input waveguide, it is advantageous that the microwave generator of the microwave installation is connected to this upstream waveguide: it is then indirectly connected to both the input waveguide and the other input waveguide.

The microwave generator generates microwaves, for example in at least one of the microwave frequency bands for industrial, scientific and medical (ISM) applications assigned by the International Telecommunication Union (ITU), and in particular the microwave frequency bands 2.450 GHz±50.0 MHz, 5.800 GHz±75.0 MHz, 433.92 MHz±0.87 MHz, 896 MHz±10 MHz and 915 MHz±13 MHz.

The disclosure also relates to a method for a continuous treatment by microwaves of a flowing fluid medium, such a method for a continuous treatment by microwaves comprising the following steps of:

- generating microwaves by means of a microwave generator connected to the input waveguide of a microwave reactor according to the disclosure;
- making a fluid medium flow inside the flow tube of said microwave reactor, by means of a flow-establishing system connected to the flow tube upstreams and downstreams.

BRIEF DESCRIPTION OF THE DRAWINGS

Other features and advantages of the present disclosure will appear on reading the detailed description hereinafter, of a non-limiting example of implementation, made with reference to the appended figures in which:

FIG. 1 already described, is a schematic view of a «downstream» microwave reactor of the state of the art;

FIG. 2 already described, is a schematic representation of an electric field inside a waveguide with a rectangular cross-section;

FIG. 3 is a schematic view of a microwave reactor according to a first embodiment of the disclosure;

FIG. 4 is a schematic sectional view of the reactor of FIG. 3, according to a sectional plane comprising the flow axis and orthogonal to the small sides of the input waveguide, with an illustration of the magnitude of the electric field in an example of a fluid medium that is absorbent or with high dielectric losses, in logarithmic scale;

FIG. 5 is a schematic sectional view of the reactor of FIG. 3, according to a sectional plane comprising the flow axis and orthogonal to the small sides of the input waveguide, with an illustration of the magnitude of the electric field in an example of a fluid medium that is absorbent or with high dielectric losses, in linear scale;

FIG. 6 is a schematic sectional view of the reactor of FIG. 3, according to a sectional plane orthogonal to the flow axis and passing through the middle of the input waveguide, with an illustration of the magnitude of the electric field in the example of a fluid medium that is absorbent or with high dielectric losses of FIGS. 4 and 5, in logarithmic scale;

FIG. 7 is a schematic perspective view of a microwave reactor according to the disclosure, with an output waveguide on which is attached a short-circuit device of the short-circuit piston type adjustable along the propagation axis;

FIG. 8 is a schematic perspective view of a microwave reactor according to the disclosure, with an output waveguide on which is attached a short-circuit device of the static short-circuit type;

FIG. 9 is a schematic perspective view, according to another angle, of the microwave reactor according to FIGS. 7 and 8, without the short-circuit device;

FIG. 10 is a schematic sectional view of the microwave reactor according to FIGS. 7 and 8, without the short-circuit device, according to a sectional plane comprising the flow axis and orthogonal to the small sides of the input waveguide; and FIG. 11 is a schematic perspective view of a microwave installation according to the disclosure, equipped at least with the microwave reactor according to FIGS. 7 and 8 and with a microwave generator connected to the input waveguide;

FIG. 12 is another schematic perspective view of a microwave installation according to the disclosure, equipped at least with the microwave reactor according to FIGS. 7 and 8 and with a microwave generator connected to the input waveguide; and FIG. 13 is a schematic perspective view of a second embodiment of the microwave reactor according to the disclosure, including another input waveguide.

DETAILED DESCRIPTION OF THE DRAWINGS

Referring to FIGS. 3 and 7 to 10, the microwave reactor 1 according to a first embodiment of the disclosure constitutes a reactor for a continuous treatment by microwaves of a flowing fluid medium, that is to say a fluid medium that flows or is in displacement.

This microwave reactor 1 finds application, desirably but without limitation, in the continuous heat treatment by microwaves of pumpable products, in particular agri-food products and in particular homogeneous liquid products or products with evenly distributed pieces in a sufficiently consistent phase.

This microwave reactor 1 comprises a cylindrical-shaped flow tube 2, integrally made of a dielectric and microwave-transparent material, such as borosilicate glass, quartz, alumina, a polymeric material like polytetrafluoroethylene or PTFE.

This flow tube 2 extends longitudinally along a flow axis 20 and has a first end 21 and a second end 22 opposite to one another, for a flow of the fluid medium inside the flow tube 2 along this flow axis 20 from the first end 21 towards the second end 22. This flow axis 20 constitutes the central axis or axis of revolution of the cylindrical flow tube 2. In the examples of FIGS. 7 to 12, the flow axis 20 is a vertical axis.

This microwave reactor 1 comprises an enclosure 3 inside which the flow tube 2 extends, wherein this enclosure 2 is made of a microwave-reflective material, such as a conductive material or a metallic material.

This enclosure 3 has a cylindrical shape with a determined diameter DE, and it extends longitudinally along the flow axis 20 over a determined enclosure length LE between a first end 31 and a second end 32 opposite to one another; this flow axis 20 constituting the central axis or axis of revolution of this cylindrical enclosure 3. Thus, the flow tube 2 and the enclosure 3 extend vertically or, alternatively, they extend horizontally or inclined with respect to a vertical or horizontal axis.

It should be noted that the diameter DE of the enclosure 3 may be adjusted according to the diameter of the flow tube 2 as well as the properties of the fluid medium. The inner diameter and the outer diameter of the flow tube 2 may also be subjected to adjustments according to the properties of the fluid medium.

As shown in FIGS. 7 to 10, this enclosure 3 may rest at a height on a support base 7 provided with several support legs 70, possibly vertically-adjustable support legs 70.

Moreover, the enclosure 3 surrounds the flow tube 2 and it has:

- on its first end 31, a first lid 33 holding the first end 21 of the flow tube 2, and
- on its second end 32, a second lid 35 holding the second end 22 of the flow tube 2;
- a first connection fitting 34 attached on the first lid 33 and tightly connected to the first end 21 of the flow tube 2 to be able to tightly connect a first pipe 61 (shown in FIGS. 7, 11 and 12) to the first end 21 of the flow tube 2;
- a second connection fitting 36 attached on the second lid 35 and tightly connected to the second end 22 of the flow tube 2 to be able to tightly connect a second pipe 62 (shown in FIGS. 7, 11 and 12) to the second end 22 of the flow tube 2.

Thus, the fluid medium enters in the flow tube 2 via the first pipe 61, flows from the first end 21 up to the second end 22 and then exits via the second pipe 62, so that the first pipe 61 forms the upstream pipe and the second pipe 62 forms the downstream pipe. Of course, the flow direction of the fluid medium may be reversed in the flow tube 2 as explained hereinbelow.

In the illustrated example, with vertical enclosure 3 and flow tube 2, the first end 21 connected to the first pipe 61 is provided at the bottom, whereas its second end 22 connected to the second pipe 62 is provided at the top, so that the fluid medium flows in the flow tube 2 from the bottom to the top, which has the advantage of reducing, and even avoiding, the formation of bubbles or inhomogeneities in the fluid medium. Of course, it may also be considered to have a reverse flow direction, that is to say from the bottom to the top.

Moreover, in variants that are not illustrated, the flow axis 20 and the flow tube 2 may be horizontal, so that the fluid medium flows horizontally. It may also be considered that the flow axis 20 and the flow tube 2 are inclined with respect to a horizontal axis or a vertical axis by an angle smaller than 90 degrees.

This microwave reactor 1 further comprises an input waveguide 4 transversely fixed on the enclosure 3, in other words on its peripheral wall or on its circumference. This input waveguide 4 is made of a microwave-reflective material, such as a conductive material or a metallic material. As a non-limiting example, this input waveguide 4 is attached on the enclosure 3 by welding.

This input waveguide 4 has a rectangular cross-section with two large sides 41 defining a large dimension GD (i.e. the sides having the largest dimension) and two small sides 42 defining a small dimension PD shorter than the large dimension GD (i.e. the sides having the smallest dimension); the large dimension GD corresponding to the length of the rectangular cross-section and the small dimension PD corresponding to the width of the rectangular cross-section. This input waveguide 4 has a free termination 43 provided with a connection crown or flange adapted to enable a junction by bolting with an upstream waveguide 8 (cf. FIGS. 11 and 12), for a connection of the input waveguide 4 with a microwave generator 9. To this end, this free termination 43 forming a connection crown or flange is provided with holes over the entire circumference thereof for the passage of screws.

This input waveguide 4 extends along a propagation axis 40 for a propagation of microwaves, originating from the microwave generator 9, along said propagation axis 40; bearing in mind that this propagation axis 40 is orthogonal to the flow axis 20. Hence, in the examples of FIGS. 7 to 12, the propagation axis 40 is a horizontal axis, and thus the input waveguide 4 extends horizontally.

Of course, the upstream waveguide 8 may, in turn, be vertical and/or horizontal and/or have elbows and/or be formed by several waveguide sections depending on the arrangement and the location of the microwave generator 9 with respect to the microwave reactor 1 and depending on the inclinations of the flow axis 20 and of the propagation axis 40.

This input waveguide 4 is coupled to the flow tube 2 for continuous treatment by microwaves of the fluid medium flowing in the flow tube 2.

For this purpose, the enclosure 3 has an input window 37 with a rectangular shape, surrounded by the input waveguide 4 for a propagation of the microwaves, originating from the microwave generator 9 and which propagate in the input waveguide 4, through the input window 37 inside the enclosure 3 where the flow tube 2 is located.

It should be noted that this coupling meets the following geometrical requirements:

- the large sides 41 of the input waveguide 4 are parallel to the flow axis 20,
- the small sides 42 of the input waveguide 4 are orthogonal to the flow axis 20;
- the diameter DE of the enclosure 3 is larger than the small dimension PD of the input waveguide 4.

In the example of FIGS. 7 to 12, the input waveguide 4 is transversely fixed on the enclosure 3 substantially at the middle (or mid-length or mid-height) of the enclosure 3, that is to say generally at a distance from the first end 31 (or from the second end 32) comprised between 0.4 and 0.6 times the enclosure length LE.

In addition, it should be noted that the input window 37, with a rectangular shape or section, is delimited by:

- two longitudinal edges 371 parallel to the large sides 41 of the input waveguide 4, and therefore parallel to the flow axis 20; and by
- two lateral edges 372 parallel to the small sides 42 of the input waveguide 4 and therefore orthogonal to the flow axis 20.

Because of the cylindrical shape of the enclosure 3, the longitudinal edges 371 of the input window 37 are rectilinear whereas the lateral edges 372 of the input window 37 are arcuate.

The input window 37 is surrounded by the input waveguide 4, and therefore its longitudinal edges 371 have a length shorter than or equal to the large dimension GD and its lateral edges 372 have a length shorter than or equal to the small dimension PD.

In the example illustrated in FIGS. 9 and 10, the longitudinal edges 371 of the input window 37 have a length shorter than the large dimension GD and the lateral edges 372 of the input window 37 have a length equal to the small dimension PD, so that the input window 37 forms an input iris. In FIG. 9, the input window 37 is in background whereas the output window 38 is in the foreground.

It may also be considered that the longitudinal edges 371 of the input window 37 have a length equal to the large dimension GD and the lateral edges 372 of the input window 37 have a length equal to the small dimension PD, and thus the input window 37 does not form an input iris.

Moreover, it should be noted that, as shown in FIG. 9 in particular, the enclosure length LE is substantially longer (herein, about 6 times longer) than the large dimension GD of the input waveguide 4.

This feature allows ensuring a homogeneous treatment, along the flow axis 20, from the flowing fluid medium in the flow tube 2 by the microwaves originating from the input waveguide 4, without resulting in the apparition of a resonance phenomenon within the enclosure 3.

It should also be noted that, in FIGS. 9 and 10, the microwave reactor 1 does not include any element disposed between the input window 37 and the flow tube 2 and prone to disturb or hinder the propagation of the microwaves from this input window 37 towards this flow tube 2.

The microwave reactor 1 may also comprise an output waveguide 5 transversely fixed on the enclosure 3 diametrically opposite to the input waveguide 4. This output waveguide 5 is made of a microwave-reflective material, such as a conductive material or a metallic material. As a non-limiting example, this output waveguide 5 is attached on the enclosure 3 by welding.

In turn, this output waveguide 5 extends along the propagation axis 40, in alignment with the input waveguide 4.

This output waveguide 5 has a rectangular cross-section with:

- two large sides 51 defining a large dimension equivalent to the large dimension GD of the input waveguide 4, wherein these large sides 51 are parallel to the flow axis 20; and
- two small sides 52 defining a small dimension equivalent to the small dimension PD of the input waveguide 4, wherein these small sides 51 are orthogonal to the flow axis 20.

Moreover, the enclosure 3 has an output window 38 diametrically opposite to the input window 37, rectangular-shaped and surrounded by the output waveguide 5 for a microwave propagation through the output window 38 between the output waveguide 5 and the inside of the enclosure 3. This output waveguide 5 has a free termination 50 provided with a connection crown or flange adapted to enable a junction by bolting with a short-circuit device 55, 56 attached on the output waveguide 5. To this end, this connection crown or flange is provided with holes over the entire circumference thereof for the passage of screws.

In the embodiment of FIGS. 7, 11 and 12, this short-circuit device is of the short-circuit piston 55 type adjustable along the propagation axis 40; such a short-circuit piston 55 having a conventional impedance matching function. Thus, the short-circuit piston 55 allows conferring flexibility on the impedance matching so that the microwave reactor 1 could suits wide ranges of dielectric characteristics of the fluid medium.

It may also be considered to get rid of such a short-circuit piston 55, for example and as illustrated in FIG. 8, by attaching on the output waveguide 5 a static short-circuit 56 type short-circuit device. Such a static short-circuit 56 may be easily dismounted (by removing the bolts) so as to be replaced with the short-circuit piston 55, and vice versa.

In a non-illustrated variant of this static short-circuit 56, the enclosure 3 may be closed opposite the input waveguide 4 and thus provide a curved reflective surface (instead of the output window 38) located diametrically opposite to the input waveguide 4 and thus forming a static short-circuit.

In addition, it should be noted that the output window 38, with a rectangular shape or section, is delimited by:

- two longitudinal edges 381 parallel to the large sides 51 of the output waveguide 5, and therefore parallel to the flow axis 20; and by
- two lateral edges 382 parallel to the small sides 52 of the output waveguide 5 and therefore orthogonal to the flow axis 20.

Because of the cylindrical shape of the enclosure 3, the longitudinal edges 381 of the output window 38 are rectilinear whereas the lateral edges 382 of the output window 38 are arcuate.

The output window 38 is surrounded by the output waveguide 5, and therefore its longitudinal edges 381 have a length shorter than or equal to the large dimension GD and its lateral edges have a length shorter than or equal to the small dimension PD.

In the example illustrated in FIG. 3, the longitudinal edges 381 of the output window 38 have a length shorter than the large dimension GD and the lateral edges 382 of the output window 38 have a length equal to the small dimension PD, so that the output window 38 forms an output iris.

In the example illustrated in FIGS. 9 and 10, the longitudinal edges 381 of the output window 38 have a length equal to the large dimension GD and the lateral edges 382 of the output window 38 have a length equal to the small dimension PD, and thus the output window 38 does not form an output iris.

FIG. 13 illustrates a second embodiment, in which a microwave reactor 1' includes, besides the previously-described input waveguide 4, another input waveguide 4'.

In this second embodiment, the microwave reactor 1' has the same elements as the microwave reactor 1 illustrated in particular by FIG. 7 and described hereinabove, and in particular:

- the enclosure 3 surrounding the flow tube 2 extending along the flow axis 20,
- the input waveguide 4, extending along the propagation axis 40 and having the large dimension GD and the small dimension PD, the large dimension GD being parallel to the flow axis 20, and
- the output waveguide 5 diametrically opposite to the input waveguide 4 and provided with a short-circuit piston 55 type short-circuit device.

The microwave reactor 1' also includes another input waveguide 4' attached on the enclosure 3 and extending along another propagation axis 40', parallel to the propagation axis 40.

It should be noticed that the input waveguide 4 is herein attached to a distance from the first end 31 equal to about 0.3 times the enclosure length LE, and that the other input waveguide 4' is attached to a distance from the first end 31 equal to about 0.7 times the enclosure length LE (or, in an equivalent manner, to a distance from the second end 32 equal to about 0.3 times the enclosure length LE).

Moreover, this other input waveguide 4' is in all aspects similar to the input waveguide 4; it is in particular made of a microwave-reflective material, so as to enable a microwave propagation along the other propagation axis 40', and has a rectangular cross-section with two large sides 41' defining a large dimension GD equal to the large dimension GD of the input waveguide 4 and two small sides 42' defining a small dimension PD equal to the small dimension PD of the input waveguide 4.

This other input waveguide 4' also surrounds another input window (not shown in FIG. 13) formed in the enclosure 3 and allowing, in the same manner as the previously-described input window 37, the microwaves circulating in the other input waveguide 4' to penetrate into the enclosure 3.

As with the input window 37, it may be considered that this other input window is in the form of an input iris, when this other input window has longitudinal edges with a length equal to the large dimension GD and lateral edges with a length equal to the small dimension PD.

In this second embodiment, the microwave reactor 1' also includes another output waveguide 5' attached on the enclosure 3 opposite the other input waveguide 4' and extending along the other propagation axis 40'.

This other output waveguide 5' has a structural and a geometry that are identical to those of the output waveguide 5: in particular, it is made of a microwave-reflective material, so as to enable a microwaves propagation along the other propagation axis 40', and has a rectangular cross-section with two large sides 51' defining a large dimension GD equal to the large dimension GD of the other input waveguide 4' (and of the output waveguide 5) and two small sides 52' defining a small dimension PD equal to the small dimension PD of the other input waveguide 4' (and of the output waveguide 5).

This other output waveguide 5' also surrounds another output window (not shown in FIG. 13) formed in the enclosure 3, diametrically opposite to the other input window and enabling, in the same manner as with the previously-described output window 38, the microwaves circulating in the other output waveguide 5' to come out of the enclosure 3.

As with the output window 38, it may be considered that this other output window is in the form of an output iris, when this other output window has longitudinal edges with a length equal to the large dimension GD and lateral edges with a length equal to the small dimension PD.

Finally, this other output waveguide 5' is attached to another short-circuit device of the short-circuit piston 55' type adjustable along the other propagation axis 40', identical to the short-circuit piston 55 type short-circuit device and having the same function.

Hence, the other input waveguide 4' enables a microwaves propagation in a way identical to the input waveguide 4, along the other propagation axis 40' offset with respect to the propagation axis 40 along the flow axis 20: this other input waveguide 4' therefore enables a treatment of the fluid medium flowing in the flow tube 2 at the level of a second treatment area offset along the flow axis 20 with respect to a first treatment area of the fluid medium associated to the input waveguide 4.

In this manner, it is possible to treat the fluid medium in a more homogeneous way along the flow axis 20 and over the entirety of the enclosure length LE of the enclosure 3.

Moreover, each of the input waveguide 4 and the other input waveguide 4' is linked to the same upstream waveguide 8' having two portions:

- a rectilinear portion 81' extending parallel to the propagation axis 40 and to the other propagation axis 40', between these two, and
- a junction portion 82', with an «Y»-like generao shape, adapted to link said rectilinear portion 81' to the input waveguide 4 on the one hand and to the other input waveguide 4' on the other hand.

Moreover, it should be noted that the rectilinear portion 81 has a rectangular cross-section identical to that of the input waveguide 4 and of the other input waveguide 4', having he same large dimension GD and the same small dimension PD.

The upstream waveguide 8' is adapted to be connected, at the level of one end 811' of the rectilinear portion 81', to a microwave generator (not represented in FIG. 13): the microwaves thus introduced into this upstream waveguide propagate along the rectilinear portion 81' and are then split in two:

- a first portion of the microwaves is introduced into the input waveguide 4 ad propagates along the propagation axis 40, and comes into contact with the fluid medium at the level of the first treatment area 400, and
- a second portion of the microwaves is introduced into the other input waveguide 4' and propagates along the other propagation axis 40', and comes into contact with the fluid medium at the level of the second treatment area 400'.

It should be noted that, because of the strictly identical structure of the input waveguide 4 and of the other input waveguide 4' (as well as, respectively, of the input window 37 and of the other input window, of the output waveguide 5 and of the other output waveguide 5', of the short-circuit piston 55 type short-circuit device and of the other short-circuit piston 55' type short-circuit device), the electric field propagating in each of the them has the same orientation and a similar intensity.

It should be noted that it may be considered that these various elements have a different structure and/or geometry, for a heterogeneous treatment of the fluid medium along the flow axis 20.

Finally, it should be noticed that the microwave reactor 1' is herein disposed on a support base 7', whose geometry is in particular adapted to that of the input waveguide 4 and of the upstream waveguide 8'.

For the implementation of a method for continuous treatment by microwaves of a flowing fluid medium, it is necessary to use a microwave installation 10 (partially illustrated in FIGS. 11 and 12) which comprises:

- a microwave reactor 1 as described hereinabove;
- a microwave generator 9 connected to the input waveguide 4 via an upstream waveguide 8; and
- a flow-establishing system 6 connected to the flow tube 2 upstreams and downstreams in order to enable a flow of the fluid medium inside the flow tube 2.

This flow-establishing system 6 comprises:

- the aforementioned first and second pipes 61, 62 which are respectively connected to the first and second ends 21, 22 of the flow tube 2;
- a device (not illustrated) adapted to make the fluidic fluid circulate in the first and second pipes 61, 62 such as for example a pump, a turbine, a piston device, . . . .

In operation, the flow-establishing system 6 is activated to make a fluid medium flow inside the flow tube 2 and the microwave generator 9 is activated to generate microwaves which are guided up to the input waveguide 4 and which pass through the input window 37 to continuously irradiate and treat the fluid medium flowing in the flow tube 2.

Of course, it may be considered that the implementation of a method for a continuous treatment by microwaves of a flowing fluid medium is carried out by means of a microwave installation including a microwave reactor 1' according to the above-described second embodiment.

In this case, one single microwave generator may be used for the propagation of microwaves in the input waveguide 4 and in the other input waveguide 4', via the upstream waveguide 8'.

FIGS. 4 to 6 represent the magnitude of the electric field (or microwave field) calculated in the microwave reactor 1 and in the fluid medium for a fluid medium equivalent to a mineral water and with a microwave frequency of 915 MHz.

FIG. 4 clearly shows that the microwave field is progressively absorbed along the flow tube 2.

FIG. 5 corresponds to FIG. 4 but with a linear scale, to highlight the fact that almost no wave subsists at the ends of the flow tube.

In turn, FIG. 6 shows that the electric field is rather uniform in the section of the flow tube 2 and is absorbed over the entire circumference thereof.

Thus, it is obvious that the fluid medium will be heated in a progressive and homogeneous way, while avoiding hot spots, which is ideal for fluid mediums requiring relatively smooth heating dynamics, even with relatively slow flow velocities.

The invention claimed is:

1. A microwave reactor for a continuous treatment by microwaves of a flowing fluid medium, said microwave reactor comprising:

a flow tube, made of a microwave-transparent material, extending longitudinally along a flow axis for a flow of the fluid medium along said flow axis, said flow tube having a first end and a second end opposite to one another;

an input waveguide extending along a propagation axis for a microwaves propagation along said propagation axis, said input waveguide having a rectangular cross-section with two large sides defining a large dimension and two small sides defining a small dimension shorter than the large dimension, and said input waveguide being coupled to the flow tube for continuous treatment by microwaves of the fluid medium, with the flow axis orthogonal to the propagation axis; and an enclosure inside which the flow tube extends at least partially, said enclosure being made of a microwave-reflective material and extending longitudinally along the flow axis over a determined enclosure length between a first end and a second end opposite to one another;

wherein:

the large sides of the input waveguide are parallel to the flow axis, whereas the small sides of the input waveguide are orthogonal to the flow axis;

the enclosure has a lateral dimension measured parallel to the small sides of the input waveguide, said lateral dimension being longer than the small dimension of the input waveguide, said input waveguide being transversely fixed on the enclosure, said enclosure having an input window surrounded by the input waveguide for a microwaves propagation through the input window inside the enclosure, and said enclosure length is longer than the large dimension of the input waveguide and the flow tube is surrounded by the enclosure forming a cavity extending on each side of the input waveguide;

and wherein the enclosure includes lids provided on the first end and the second end, said lids being provided with connection fittings to connect the first end and the second end of the flow tube respectively to a first pipe and to a second pipe of a flow-establishing system for making the fluid medium flow from the first end of the flow tube towards the second end of the flow tube.

2. The microwave reactor according to claim 1, wherein the enclosure length is 1.5 times to 6 times longer than the large dimension of the input waveguide.

3. The microwave reactor according to claim 1, wherein the input window is delimited by two longitudinal edges parallel to the large sides of the input waveguide and by two lateral edges parallel to the small sides of the input waveguide, wherein these longitudinal edges have a length shorter than or equal to the large dimension and the lateral edges have a length shorter than or equal to the small dimension.

4. The microwave reactor according to claim 3, wherein the longitudinal edges of the input window have a length shorter than the large dimension and the lateral edges of the input window have a length equal to the small dimension, so that the input window forms an input iris.

5. The microwave reactor according to claim 1, wherein the enclosure has a circular section with a diameter corresponding to the lateral dimension.

6. The microwave reactor according to claim 1, wherein the enclosure includes no inner element disposed between the input window and the flow tube.

7. The microwave reactor according to claim 1, comprising an output waveguide transversely fixed on the enclosure diametrically opposite to the input waveguide, wherein:

said output waveguide extends along the propagation axis and has a rectangular cross-section with two large sides defining a large dimension, and two small sides defining a small dimension shorter than the large dimension, the large sides of the output waveguide being parallel to the flow axis, whereas the small sides of the output waveguide are orthogonal to the flow axis, the large dimension of the output waveguide being equivalent to the large dimension of the input waveguide and the small dimension of the output waveguide being equivalent to the small dimension of the input waveguide; and said enclosure has an output window diametrically opposite to the input window and surrounded by the output waveguide for a microwaves propagation through the output waveguide.

8. The microwave reactor according to claim 7, further comprising a short-circuit device attached on the output waveguide, said short-circuit device being either of the short-circuit piston type adjustable along the propagation axis, or of the static short-circuit type.

9. The microwave reactor according to claim 7, wherein the output window is delimited by two longitudinal edges parallel to the large sides of the output waveguide and by two lateral edges parallel to the small sides of the output waveguide, wherein the longitudinal edges have a length shorter than or equal to the large dimension and the lateral edges have a length shorter than or equal to the small dimension.

10. The microwave reactor according to claim 9, wherein the longitudinal edges of the output window have a length shorter than the large dimension and the lateral edges of the output window have a length equal to the small dimension, so that the output window forms an output iris.

11. The microwave reactor according to claim 1, wherein the enclosure is closed opposite the input waveguide and thus provides a curved reflective surface located diametrically opposite to the input waveguide.

12. The microwave reactor according to claim 1, wherein the input waveguide is transversely fixed on the enclosure:

either at a distance from the first end comprised between 0.4 and 0.6 times the enclosure length;

or at a distance from the first end comprised between 0.1 and 0.4 times the enclosure length.

13. The microwave reactor according to claim 1, wherein the flow axis is a vertical axis so that the flow tube and the enclosure extend vertically, and the propagation axis is a horizontal axis so that the input waveguide extends horizontally.

14. The microwave reactor according to claim 13, wherein the enclosure rests at height on a support base.

15. The microwave reactor according to claim 1, including another input waveguide extending parallel to the propagation axis, said other input waveguide having a rectangular cross-section with two large sides defining a large dimension and two small sides defining a small dimension shorter than the large dimension, and said other input waveguide being coupled to the flow tube for a continuous treatment by microwaves of the fluid medium;

wherein the large sides of said other input waveguide are parallel to the flow axis, whereas the small sides of said other input waveguide are orthogonal to the flow axis;

wherein the lateral dimension of the enclosure is larger than the small dimension of said other input waveguide, said other input waveguide being transversely fixed on the enclosure, said enclosure having another input window surrounded by said other input waveguide for a microwaves propagation through said other input window inside the enclosure, and wherein the enclosure length is strictly-longer than the large dimension of said other input waveguide.

16. The microwave reactor according to claim 15, wherein the input waveguide and the other input waveguide are linked to the same upstream waveguide intended for the introduction of microwaves inside each of said input waveguides and other input waveguide, said upstream waveguide having at least one rectilinear portion having a rectangular cross-section with two large sides defining a large dimension and two small sides defining a small dimension shorter than the large dimension, the large sides of said upstream waveguide being parallel to the flow axis, whereas the small sides of said upstream waveguide are orthogonal to the flow axis.

17. A microwave installation for a continuous treatment by microwaves of a flowing fluid medium, said microwave installation comprising:

a microwave reactor according to claim 1;

a microwave generator connected to the input waveguide; and a flow-establishing system connected to the first end and the second end of the flow tube to ensure a flow of the fluid medium inside the flow tube from the first end of the flow tube towards the second end of the flow tube.

18. A method for a continuous treatment by microwaves of a flowing fluid medium, said method for a continuous treatment by microwaves including the following steps:

generating microwaves by means of a microwave generator connected to the input waveguide of a microwave reactor according to claim 1; and making a fluid medium flow inside the flow tube of said microwave reactor, by means of a flow-establishing system connected to the first end and the second end of the flow tube.

19. A microwave reactor for a continuous treatment by microwaves of a flowing fluid medium, said microwave reactor comprising:

a flow tube, made of a microwave-transparent material, extending longitudinally along a flow axis for a flow of the fluid medium along said flow axis;

an input waveguide extending along a propagation axis for a microwaves propagation along said propagation axis, said input waveguide having a rectangular cross-section with two large sides defining a large dimension and two small sides defining a small dimension shorter than the large dimension, and said input waveguide being coupled to the flow tube for continuous treatment by microwaves of the fluid medium, with the flow axis orthogonal to the propagation axis; and an enclosure inside which the flow tube extends at least partially, said enclosure being made of a microwave-reflective material and extending longitudinally along the flow axis;

said microwave reactor wherein:

the large sides of the input waveguide are parallel to the flow axis, whereas the small sides of the input waveguide are orthogonal to the flow axis;

the enclosure has a lateral dimension measured parallel to the small sides of the input waveguide, said lateral dimension being longer than the small dimension of the input waveguide, said input waveguide being transversely fixed on the enclosure, said enclosure having an input window surrounded by the input waveguide for a microwaves propagation through the input window inside the enclosure, and the enclosure extends longitudinally along the flow axis over a determined enclosure length between a first end and a second end opposite to one another, said enclosure length being longer than the large dimension of the input waveguide;

and wherein the microwave reactor comprises an output waveguide transversely fixed on the enclosure diametrically opposite to the input waveguide, wherein:

said output waveguide extends along the propagation axis and has a rectangular cross-section with two large sides defining a large dimension, and two small sides defining a small dimension shorter than the large dimension, the large sides of the output waveguide being parallel to the flow axis, whereas the small sides of the output waveguide are orthogonal to the flow axis, the large dimension of the output waveguide being equivalent to the large dimension of the input waveguide and the small dimension of the output waveguide being equivalent to the small dimension of the input waveguide; and said enclosure has an output window diametrically opposite to the input window and surrounded by the output waveguide for a microwaves propagation through the output waveguide.

20. A microwave reactor for a continuous treatment by microwaves of a flowing fluid medium, said microwave reactor comprising:

a flow tube, made of a microwave-transparent material, extending longitudinally along a flow axis for a flow of the fluid medium along said flow axis;

an input waveguide extending along a propagation axis for a microwaves propagation along said propagation axis, said input waveguide having a rectangular cross-section with two large sides defining a large dimension and two small sides defining a small dimension shorter than the large dimension, and said input waveguide being coupled to the flow tube for continuous treatment by microwaves of the fluid medium, with the flow axis orthogonal to the propagation axis; and an enclosure inside which the flow tube extends at least partially, said enclosure being made of a microwave-reflective material and extending longitudinally along the flow axis;

said microwave reactor wherein:

the large sides of the input waveguide are parallel to the flow axis, whereas the small sides of the input waveguide are orthogonal to the flow axis;

the enclosure has a lateral dimension measured parallel to the small sides of the input waveguide, said lateral dimension being longer than the small dimension of the input waveguide, said input waveguide being transversely fixed on the enclosure, said enclosure having an input window surrounded by the input waveguide for a microwaves propagation through the input window inside the enclosure, and the enclosure extends longitudinally along the flow axis over a determined enclosure length between a first end and a second end opposite to one another, said enclosure length being longer than the large dimension of the input waveguide;

and wherein the microwave reactor comprises another input waveguide extending parallel to the propagation axis, said other input waveguide having a rectangular cross-section with two large sides defining a large dimension and two small sides defining a small dimension shorter than the large dimension, and said other input waveguide being coupled to the flow tube for a continuous treatment by microwaves of the fluid medium;

wherein the large sides of said other input waveguide are parallel to the flow axis, whereas the small sides of said other input waveguide are orthogonal to the flow axis;

wherein the lateral dimension of the enclosure is larger than the small dimension of said other input waveguide, said other input waveguide being transversely fixed on the enclosure, said enclosure having another input window surrounded by said other input waveguide for a microwaves propagation through said other input window inside the enclosure, and wherein the enclosure length is longer than the large dimension of said other input waveguide.

* * * * *